(12) United States Patent
Nittala et al.

(10) Patent No.: US 9,473,396 B1
(45) Date of Patent: Oct. 18, 2016

(54) SYSTEM FOR STEERING DATA PACKETS IN COMMUNICATION NETWORK

(71) Applicants: Satya Srinivasa Murthy Nittala, Hyderabad (IN); Srinivasa R. Addepalli, San Jose, MI (US); Balaji Padnala, Hyderabad (IN)

(72) Inventors: Satya Srinivasa Murthy Nittala, Hyderabad (IN); Srinivasa R. Addepalli, San Jose, MI (US); Balaji Padnala, Hyderabad (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 55 days.

(21) Appl. No.: 14/704,988

(22) Filed: May 6, 2015

(51) Int. Cl.
*H04L 12/28* (2006.01)
*H04L 12/721* (2013.01)
*H04L 12/46* (2006.01)

(52) U.S. Cl.
CPC ........... *H04L 45/38* (2013.01); *H04L 12/4641* (2013.01)

(58) Field of Classification Search
None
See application file for complete search history.

(56) References Cited

U.S. PATENT DOCUMENTS

| 8,284,664 | B1 | 10/2012 | Aybay et al. | |
|---|---|---|---|---|
| 8,743,885 | B2 | 6/2014 | Khan et al. | |
| 2013/0272305 | A1 | 10/2013 | Lefebvre et al. | |
| 2014/0013324 | A1 | 1/2014 | Zhang et al. | |
| 2014/0301388 | A1* | 10/2014 | Jagadish | H04L 67/2814 370/389 |
| 2014/0362857 | A1 | 12/2014 | Guichard et al. | |
| 2015/0263960 | A1* | 9/2015 | Kasturi | H04L 47/22 370/230.1 |
| 2016/0149788 | A1* | 5/2016 | Zhang | H04L 43/10 709/224 |

OTHER PUBLICATIONS

Dunbar et al.; "Layer 4-7 Service Chain problem statement", IETF, https://tools.ietf.org/html/draft-dunbar-I4-I7-sc-problem-statement-00, Jul. 11, 2013.

\* cited by examiner

*Primary Examiner* — Duc C Ho
(74) *Attorney, Agent, or Firm* — Charles E. Bergere

(57) ABSTRACT

A system for steering data packets in a communication network that includes compute nodes having processors for executing application and service virtual machines (VMs), and traffic steering accelerators. A virtual local area network-identifier (VLAN-ID) assignment module generates records and associates the records with the service VMs. Each record includes an input VLAN-ID, an output VLAN-ID, and a port number corresponding to one of the service VMs. A service-chaining module generates chaining rules associated with n-Tuples. A traffic steering controller generates a chain of the records based on the service chaining rules. The traffic steering accelerator then steers the data packets based on the input and output VLAN-IDs included in the data packet.

20 Claims, 9 Drawing Sheets

SYSTEM FOR STEERING DATA PACKETS IN COMMUNICATION NETWORK

BACKGROUND

The present invention generally relates to communication networks, and, more particularly, to a system for steering data packets in a communication network.

A communication network typically includes multiple digital systems such as gateways, switches, and access points. In a cloud computing environment, multiple computers are connected to each other and to servers via the communication network to exchange data packets, e.g., the World Wide Web (WWW) or the Internet. Generally, compute nodes are used as servers to service the computers. The compute nodes include processors for executing multiple application and service virtual machines.

A virtual machine (VM) is an operating system that runs on a processor of a compute node and uses the same hardware resources as the compute node. Application VMs executed on the compute nodes include user-defined applications and are based on a transmission control internet protocol (TCP-IP) or a user datagram protocol (UDP), while the service VMs executed on the compute node include network services such as network security services such as firewall (FW), distributed denial of security service (DDoS), intrusion detection system (IDS), and web application firewall (WAF).

A compute node running multiple application and service VMs will receive data packets from one of the application VMs being executed thereon or from another compute node in the network. The data packets need to be serviced by a set of network services defined by a network administrator. To service a data packet with the set of network services, the data packet must be steered through a set of network service VMs corresponding to the set of network services. Steering the data packets through the set of network service VMs based on the traffic steering rules and the set of network services assigned to the data packet is called traffic steering.

One known technique for steering data packets includes utilization of a perimeter switch. The perimeter switch includes two types of ports: input and output ports. Each of the input and output ports includes node ports and transit ports. A data packet thus is received at the node ports of the perimeter switch. Based on a classification operation, the data packet is assigned a service chain that identifies the services and corresponding service VMs required for processing the data packet. The node ports are used for determining the position or the service stage of the data packet in the service chain and the next service in the service chain. Based on the next service to process the data packet, a new destination address of a next service VM is assigned to the data packet. Subsequently, the data packet is transmitted on a node port associated with the next service in the service chain.

The total number of services required for servicing the data packet is variable. Further, to identify the node ports of the service VMs for additional services that may be added for scalability, the hardware in the compute nodes must be upgraded. Thus, the utilization of ports to detect the position of the data packet in the service chain does not provide a scalable solution as the use of ports to determine the position of the data packet in the service chain will include multiple ports, eventually requiring a hardware upgrade for each compute node.

Another technique for steering data packets involves the introduction of new network protocols in the packet header to identify the next service VM for processing the data packet. This too will involve upgrading the software for identifying the protocol information in the data packet.

Therefore, it would be advantageous to have a system and method for steering data packets that is scalable and doesn't require hardware or software upgrades at the compute nodes.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
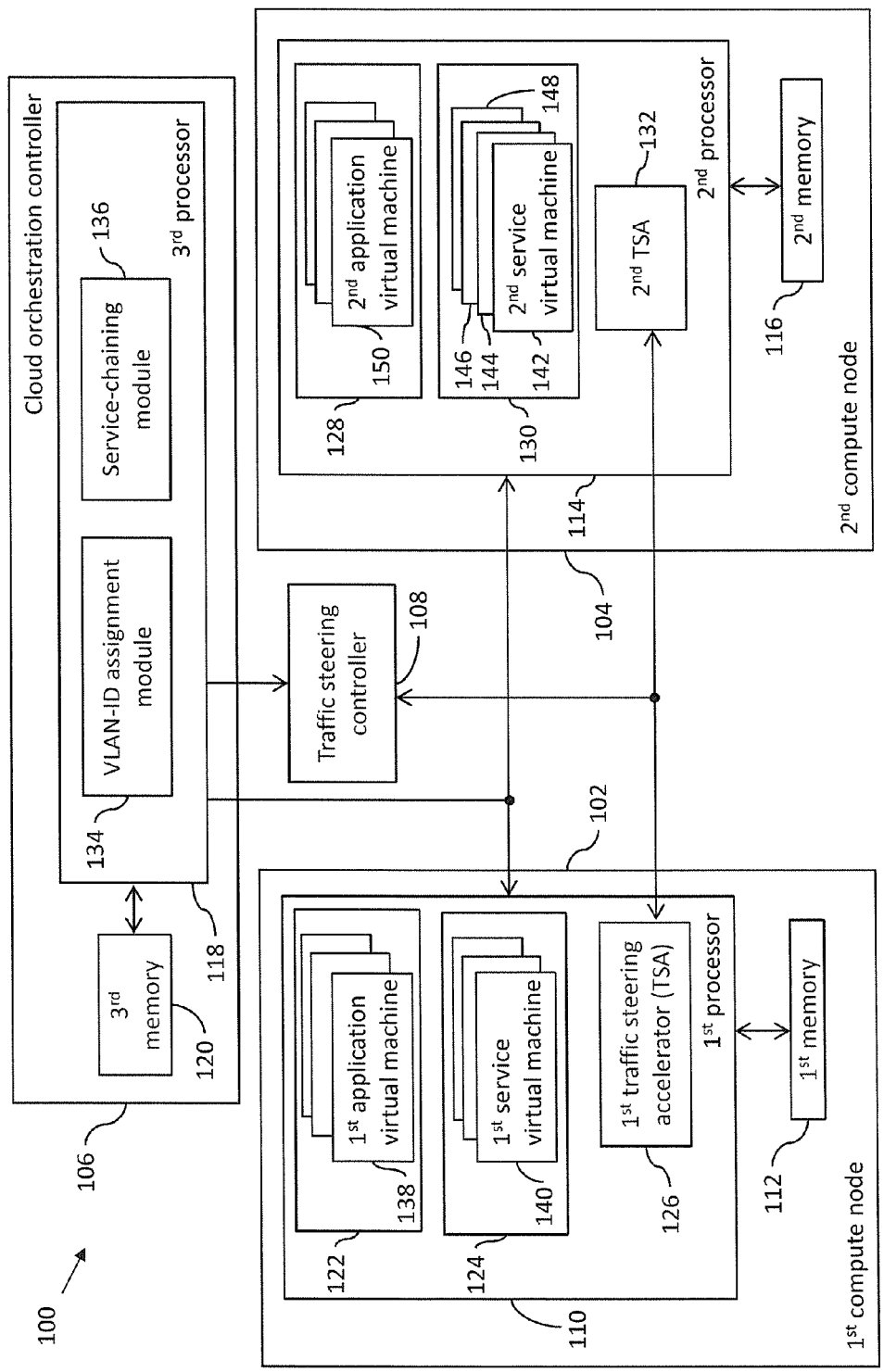
FIG. 1 is a schematic block diagram of a system for steering data packets in a communication network in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a system for steering a plurality of data packets in a communication network is provided. The system includes a plurality of compute nodes having a corresponding plurality of processors for executing a plurality of application and service VMs and a corresponding plurality of traffic steering accelerators. A first one of the compute nodes includes a first processor configured for executing a first one of the application VMs and a first set of the service VMs, a first traffic steering accelerator, a virtual local area network-identifier (VLAN- ID) assignment module, a service-chaining module, and a traffic steering controller. The first application VM outputs a first data packet and the first traffic steering accelerator receives the first data packet. The VLAN-ID assignment module generates a plurality of records and associates these records with the service VMs. Each of the records includes a VLAN-ID set and a port number of a corresponding one of the service VMs. The VLAN-ID set includes input and output VLAN-IDs of the corresponding service VM. The service-chaining module receives the records and generates a plurality of service chaining rules associated with a plurality of n-Tuples configured for the application VMs. The traffic steering controller receives the first data packet and the service chaining rules and the corresponding records, sequences the records based on the service chaining rules for generating a plurality of chained records, and outputs a first chain of the chained records corresponding to a first one of the n-Tuples based on the first data packet to the first traffic steering accelerator. The first traffic steering accelerator receives the first chained records, retrieves a first record of the first chained records, retrieves a first input VLAN-ID of the first record, adds the first input VLAN-ID to the first data packet, and transmits the first data packet to at least one of a first one of the service VMs and a second one of the traffic steering accelerators based on the first input VLAN-ID.

In another embodiment of the present invention, a method for steering data packets in a communication network is provided. The communication network includes a VLAN-ID assignment module, a service-chaining module, a traffic steering controller, and a plurality of compute nodes having a corresponding plurality of processors for executing a plurality of application and service VMs and a corresponding plurality of traffic steering accelerators. A first one of the compute nodes includes a first one of the processors and a first one of the traffic steering accelerators. The method includes generating a plurality of records by the VLAN-ID assignment module, where each of the records includes a VLAN-ID set and a port number of a corresponding service VM of the plurality of service VMs, and wherein the VLAN-ID set includes input and output VLAN-IDs of the corresponding service VM. The records are associated with the service VMs. The service chaining module receives the records and generates a plurality of service chaining rules associated with a plurality of n-Tuples configured for the application VMs. The traffic steering controller receives the service chaining rules and the corresponding records and sequences the records based on the service chaining rules for generating a plurality of chained records. The first processor executes a first one of the application VMs and a first set of the service VMs, where the first application VM outputs a first one of the data packets. The first traffic steering accelerator receives the first data packet and provides it to the traffic steering controller. The first traffic steering controller provides a first chain of the chained records corresponding to a first one of the n-Tuples based on the first data packet to the first traffic steering accelerator. The first traffic steering accelerator retrieves a first record of the first chained records, retrieves a first input VLAN-ID of the first record, adds the first input VLAN-ID to the first data packet, and transmits the first data packet to at least one of a first service VM of the first set of service VMs and a second one of the traffic steering accelerators based on the first input VLAN-ID.

Various embodiments of the present invention provide a system for steering data packets in a communication network. The system includes a plurality of compute nodes, a VLAN-ID assignment module, a service-chaining module, and a traffic steering controller. The compute nodes execute a application and service VMs and a corresponding plurality of traffic steering accelerators. The VLAN-ID assignment module generates records and associates the records with the service VMs. Each record includes a VLAN-ID set and a port number of a corresponding service VM. The VLAN-ID set includes input and output VLAN-IDs of the corresponding service VM. The service-chaining module generates service chaining rules associated with a plurality of n-Tuples configured for the application VMs based on the records. The traffic steering controller sequences the records based on the service chaining rules for generating a plurality of chained records.

A first one of the compute nodes executes a first application VM, a first set of service VMs, and a first traffic steering accelerator. The first application VM outputs a first one of the data packets. The traffic steering controller outputs a first chain of the chained records corresponding to a first one of the n-Tuples based on the first data packet to the first traffic steering accelerator. The first traffic steering accelerator receives the first data packet and the first chain of records, retrieves a first record of the first chain, retrieves a first input VLAN-ID of the first record, adds the first input VLAN-ID to the first data packet, and transmits the first data packet to at least one of a first one of the service VMs and a second one of the traffic steering accelerator based on the first input VLAN-ID.

Thus, the data packets are steered in the communication network based on the input and output VLAN-IDs in the data packet. One of the VLAN-IDs is associated with the first data packet, thereby enabling identification of the first service VM for processing the first data packet. Thus, hardware or software implemented in the compute nodes does not need to be upgraded. Furthermore, since the servicing of the data packets is evenly distributed across the communication network based on the instances generated by the service VMs, the processing load due to steering of the data packets is reduced.

Referring now to FIG. 1, a schematic block diagram of a system 100 for steering data packets in a communication network (not shown) in accordance with an embodiment of the present invention is shown. The system 100 is included in a cloud computing environment for providing various cloud-based solutions such as infrastructure as a service (IaaS), platform as a service (PaaS), and software as a service (SaaS). The system 100 includes first and second compute nodes 102 and 104, a cloud orchestration controller 106, and a traffic steering controller 108.

The first compute node 102 includes a first processor 110 and a first memory 112. The second compute node 104 includes a second processor 114 and a second memory 116. The cloud orchestration controller 106 includes a third processor 118 and a third memory 120. The first processor 110 executes a first set of application VMs 122, a first set of service VMs 124, and a first traffic steering accelerator 126. The second processor 114 executes a second set of application VMs 128, a second set of service VMs 130, and a second traffic steering accelerator 132. The third processor 118 executes a virtual local area network-identifier (VLAN-ID) assignment module 134 and a service-chaining module 136.

The first set of application VMs 122 includes a first application VM 138. The first set of service VMs 124 includes a first service VM 140. The second set of service VMs 130 includes second through fifth service VMs 142-148. The second set of application VMs 128 includes a second application VM 150. The system 100 further includes multiple compute nodes (not shown) that include multiple processors (not shown) and multiple traffic steering accelerators (not shown). The multiple processors execute multiple application and service VMs (not shown).

The first and second compute nodes 102 and 104 may be desktop or server machines with high-end processors and a hard disk. They are employed in data centers and are utilized for executing multiple VMs. The multiple VMs include the first and second sets of application VMs 122 and 128 and the first and second sets of service VMs 124 and 130. The first and second compute nodes 102 and 104 include a hypervisor (not shown) that allows the multiple VMs to share the first and second processors 110 and 114, respectively, thereby sharing a single hardware for executing the multiple VMs. In one embodiment, the hypervisor is a kernel-based VM (KVM). The compute nodes including the first and second compute nodes 102 and 104 communicate with each other by utilizing network virtualization technologies. The data packets are transmitted between the compute nodes by way of an overlay network tunnel based on a protocol standard. Examples of overlay network tunnels include a virtual extensible local area network (VXLAN), a network virtualization using generic routing encapsulation (NVGRE), a location and identity separation protocol (LISP), and transport interconnection for lots of links (TRILL).

The cloud orchestration controller 106 acts as an interconnector in the cloud computing environment for managing and coordinating multiple user-defined applications and network service functions corresponding to the multiple VMs executed by the compute nodes. In one embodiment, the cloud orchestration controller 106 is an OpenStack controller.

The first and second processors 110 and 114 execute the multiple VMs. They act as a common hardware resource for multiple operating systems, i.e., the multiple VMs that are being launched and executed by the first and second processors 110 and 114. In one embodiment, the first and second processors 110 and 114 are at least one of single-core processors and multi-core processors. The first and second memories 112 and 116 are connected to the first and second processors 110 and 114, respectively. In one embodiment, the first and second memories 112 and 116 are cache memories and random access memories (RAMs).

The third processor 118 further executes software modules that associate and store the identification information of the multiple VMs as well as provide service chaining rules associated with the data packets to the traffic steering controller 108. The third processor 118 includes at least one of a single and multi-core processor. The third memory 120 is connected to the third processor 118 and includes at least one of a cache memory and a RAM. In another embodiment of the present invention, the first, second, and third memories 112, 116, and 120 may be internal memories of the first, second, and third processors 110, 114, and 118, respectively.

The first and second sets of application VMs 122 and 128 include multiple user defined applications based on a transmission control protocol (TCP) and a user datagram protocol (UDP). The first and second sets of service VMs 124 and 130 include the multiple service VMs corresponding to the network service functions for processing a data packet. Examples of the network service functions include firewall (FW), distributed denial of security service (DDoS), intrusion detection system (IDS), and web application firewall (WAF). The count of application and service VMs that can be hosted by each compute node depends on the memory and computing power of the compute nodes. The application and service VMs are elastic in nature. Based on the processing requirement of the data packets and for balancing the processing load of the data packets, new VMs are launched on the multiple compute nodes.

The third processor 118 executes the VLAN-ID assignment module 134 for generating multiple records and associating the multiple records with the multiple service VMs. Each record of the multiple records includes a VLAN-ID set and a port number of a corresponding service VM of the multiple service VMs. The VLAN-ID set includes input and output VLAN-IDs of the corresponding service VM. A first set of records of the multiple records is associated with the first set of service VMs 124 by the VLAN-ID assignment module 134. Thus, the first set of records corresponds to the first set of service VMs 124 that are executed by the first processor 110. As a result, a first record of the first set of records corresponds to the first service VM 140. The first record includes a first input VLAN-ID, a first output VLAN-ID, and a first port number. Subsequently, a second set of records is associated with the second set of service VMs 130. As a result, a second record of the second set of records corresponds to the second service VM 142. The second record includes a second input VLAN-ID, a second output VLAN-ID, and a second port number. The VLAN-ID assignment module 134 further stores a mapping between multiple port numbers corresponding to the multiple service VMs, corresponding multiple virtual networks, and corresponding multiple VLAN-ID sets in the third memory 120.

Table A represents the mapping between service VMs and the corresponding virtual networks and the VLAN-ID sets.

TABLE A

| Service VM (VM) name/ID | Virtual Network (VN) | VLAN-ID set assigned to the service VM |
|---|---|---|
| Service VM-1 | VN-1 | VLAN-ID-IN = 2 |
| | | VLAN-ID-OUT = 3 |
| Service VM-2 | VN-1 | VLAN-ID-IN = 4 |
| | | VLAN-ID-OUT = 5 |
| Service VM-3 | VN-2 | VLAN-ID-IN = 2 |
| | | VLAN-ID-OUT = 3 |
| Service VM-4 | VN-1 | VLAN-ID-IN = 6 |
| | | VLAN-ID-OUT = 7 |

The service VMs include the multiple sets of service VMs that are executed by the multiple processors. Each virtual network identifier (VNI) is used to represent a corresponding virtual network. The corresponding application and service VMs in the first set of application and service VMs 122 and 124 and the second set of application and service VMs 128 and 130, respectively, are in communication with the first and second traffic steering accelerators 126 and 132, respectively, on a specific port. Each specific port represents the corresponding virtual network. VXLAN overlay network protocol is used to achieve virtualization with each VNI representing a virtual network. Thus, each compute node includes a unicast network port that is created for each overlay protocol such as VXLAN and based on the number of compute nodes, broadcast ports are created in the compute nodes. Furthermore, to send the data packets to remote compute nodes, network ports associated with a layer 2 (L2) virtual network are utilized. As shown table A, the input and output VLAN-IDs associated with a service VM-1 and a service VM-3 can be same (VLAN-ID-IN=2 and VLAN-ID-OUT=3) as the service VMs 1 and 3 are in different virtual networks (VN-1 and VN-2).

The first processor 110 executes a network service configuration module (not shown) for configuring VLAN interfaces of the first set of service VMs 124 based on the corresponding first set of records. The first record corresponding to the first service VM 140 is included in a VLAN-ID file and is accessed from a pre-defined path '/fileinject' of the first service VM 140. The VLAN-ID file is injected by the VLAN-ID assignment module 134 in the first service VM 140. Utilizing the input and output VLAN-IDs from the first record, the network service configuration module thus configures the VLAN interfaces for ingress and egress of the data packets to and from the first service VM 140, respectively. In an example, the network service configuration module configures Eth 1.4 and Eth 1.5 virtual interfaces for ingress and egress data packets, respectively. Subsequently, the VLAN-ID assignment module 134 injects multiple VLAN-ID files including the corresponding multiple VLAN-ID sets in the multiple service VMs.

The third processor 118 executes the service-chaining module 136 for receiving the multiple records and generating multiple service chaining rules associated with multiple n-Tuples configured for the multiple application VMs. Each n-Tuple of the multiple n-Tuples includes a 5-Tuple that includes a source internet protocol (IP) address, a destination IP address, a source port number, a destination port number, and a protocol information of an application VM that outputs the data packet and an application VM that receives the data packet processed with a set of network services.

The first and second traffic steering accelerators 126 and 132 are OpenFlow switches or software switches. The first and second traffic steering accelerators 126 and 132 steer the data packets to the first and second sets of service VMs 124 and 130, respectively, based on the packet fields. In another embodiment of the present invention, the first and second traffic steering accelerators 126 and 132 are hardware accelerators such as cryptographic accelerators and co-processors.

The first and second traffic steering accelerators 126 and 132 store six OpenFlow (OF) tables, i.e., first through sixth tables (not shown), in the first and second memories 112 and 116, respectively. The first and second traffic steering accelerators 126 and 132 utilize the first table to classify and direct the data packets received from the first and second sets of service VMs 124 and 130. The first and second traffic steering accelerators 126 and 132 utilize the second table to determine when the data packets have to be sent to the traffic steering controller 108 for receiving corresponding chain of records and to determine the service VMs based on the VLAN-IDs embedded in the data packets. The first and second traffic steering accelerators 126 and 132 utilize the third table to determine the VMs of the first and second sets of service VMs 124 and 130, respectively, for processing the data packets.

The first and second traffic steering accelerators 126 and 132 utilize the fourth table to identify a destination VM for the data packets that includes VLAN-IDs in the data packets. The first and second traffic steering accelerators 126 and 132 utilize the fifth table to determine a destination for the data packets received from an application and service VM in the first set of application and service VMs 122 and 124 and the second set of application and service VMs 128 and 130, respectively, to another application and service VM in the first and second compute nodes 102 and 104 and the multiple compute nodes. The first and second traffic steering accelerators 126 and 132 utilize the sixth table to determine a destination for the data packets received from the second and first traffic steering accelerators 132 and 126, respectively and other traffic steering accelerators to the first set of application and service VMs 122 and 124 and the second set of application and service VMs 128 and 130, respectively.

The traffic steering controller 108 is a centrally located controller in the cloud computing environment and is configured with the service chaining rules. OpenStack hosts a dashboard horizon user interface module (not shown) that allows a user or a network administrator to configure the service chaining rules in the traffic steering controller 108. In an example, the traffic steering controller 108 is an OpenFlow controller. In another example, the traffic steering controller 108 is a software module that is executed by a fourth processor (not shown).

The traffic steering controller 108 is connected to the multiple traffic steering accelerators and the third processor 118 for receiving the data packets and the multiple service chaining rules and the corresponding multiple records, respectively. The traffic steering controller 108 sequences the multiple records based on the multiple service chaining rules for generating multiple chain of records.

In an example, the first application VM 138 outputs a first data packet. When the first traffic steering accelerator 126 receives the first data packet from the first application VM 138, the first traffic steering accelerator 126 transmits the first data packet to the traffic steering controller 108. The traffic steering controller 108 receives the first data packet and identifies a first n-Tuple corresponding to the first data packet. On identifying the first n-Tuple, the traffic steering controller 108 retrieves a first chain of records based on the first n-Tuple and outputs the first chain of records to the first traffic steering accelerator 126.

On receiving the first chain of records, the first traffic steering accelerator 126 retrieves the first record of the first chain. It further retrieves the first input VLAN-ID of the first record. On retrieving the first input VLAN-ID, the first traffic steering accelerator 126 adds the first input VLAN-ID to the first data packet. Based on the first input VLAN-ID, the first traffic steering accelerator 126 transmits the first data packet to at least one of a service VM of the first set of service VMs 124 and a traffic steering accelerator of the multiple traffic steering accelerators.

Since the first input VLAN-ID corresponds to the first service VM 140, the first traffic steering accelerator 126 transmits the first data packet having the first input VLAN-ID to the first service VM 140 through a virtual port that corresponds to the first port number. On receiving the first data packet from the first traffic steering accelerator 126, the first service VM 140 removes the first input VLAN-ID added to the first data packet. The first data packet is then processed with a first service function. In one embodiment, the first service VM 140 is configured for servicing the data packets with firewall services. Thus, the first service function corresponds to the firewall servicing function of the first service VM 140. After servicing the first data packet with the first service function, the first service VM 140 adds the first output VLAN-ID to the first data packet. The first data packet is transmitted on the virtual port to the first traffic steering accelerator 126.

The first traffic steering accelerator 126 receives the first data packet from the first service VM 140. The first data packet is now processed with the first service function and has the associated first output VLAN-ID. The first traffic steering accelerator 126 removes the first output VLAN-ID and based on the first output VLAN-ID identifies the first record in the first chain of records. The first traffic steering accelerator 126 checks to determine if the first chain of records includes the second record. When the first traffic steering accelerator 126 determines that the second record is included in the first chain of records, it retrieves the second record that is subsequent to the first record from the first chain of records. The first traffic steering accelerator 126 retrieves the second input VLAN-ID of the second record and adds the second input VLAN-ID to the first data packet. Since the second input VLAN-ID corresponds to the input VLAN-ID of the second service VM 142, the first traffic steering accelerator 126 transmits the first data packet to the second traffic steering accelerator 132 in the second compute node 104 by way of an overlay network tunnel (not shown).

The second traffic steering accelerator 132 receives the first data packet from the first traffic steering accelerator 126 and provides the first data packet to the traffic steering controller 108. The traffic steering controller 108 configures the first chain of records for the first data packet in the second traffic steering accelerator 132. The second traffic steering accelerator 132 retrieves the second record from the first chain of records based on the second input VLAN-ID of the first data packet. On identifying a match between the second input VLAN-ID of the second record and the second input VLAN-ID of the first data packet, the second traffic steering accelerator 132 transmits the first data packet to at least one of a service VM of the second set of service VMs 130.

Since the second input VLAN-ID corresponds to the second service VM 142, the second traffic steering accelerator 132 thus transmits the first data packet to the second service VM 142. The second service VM 142 receives the first data packet from the second traffic steering accelerator 132, removes the second input VLAN-ID added to the first data packet, processes the first data packet with a second service function, adds the second output VLAN-ID to the first data packet, and transmits the first data packet to the second traffic steering accelerator 132.

The second traffic steering accelerator 132 further receives the first data packet from the second service VM 142. The second traffic steering accelerator 132 removes the second output VLAN-ID from the first data packet. The second traffic steering accelerator 132 identifies the second record from the first chain of records based on the second output VLAN-ID. The second traffic steering accelerator 132 checks for any more records associated with the first chain of records. If a third record is included in the first chain of records, the second traffic steering accelerator 132 retrieves a third input VLAN-ID from the third record, adds the third input VLAN-ID to the first data packet, and transmits the first data packet to at least one of a service VM of the second set of service VMs 130 and another traffic steering accelerator (not shown) of the multiple traffic steering accelerators. If a third record is not included in the first chain of records, the second traffic steering accelerator 132 transmits the first data packet to at least one of an application VM of the second set of application VMs 128 without applying further network services.

Figure 2:
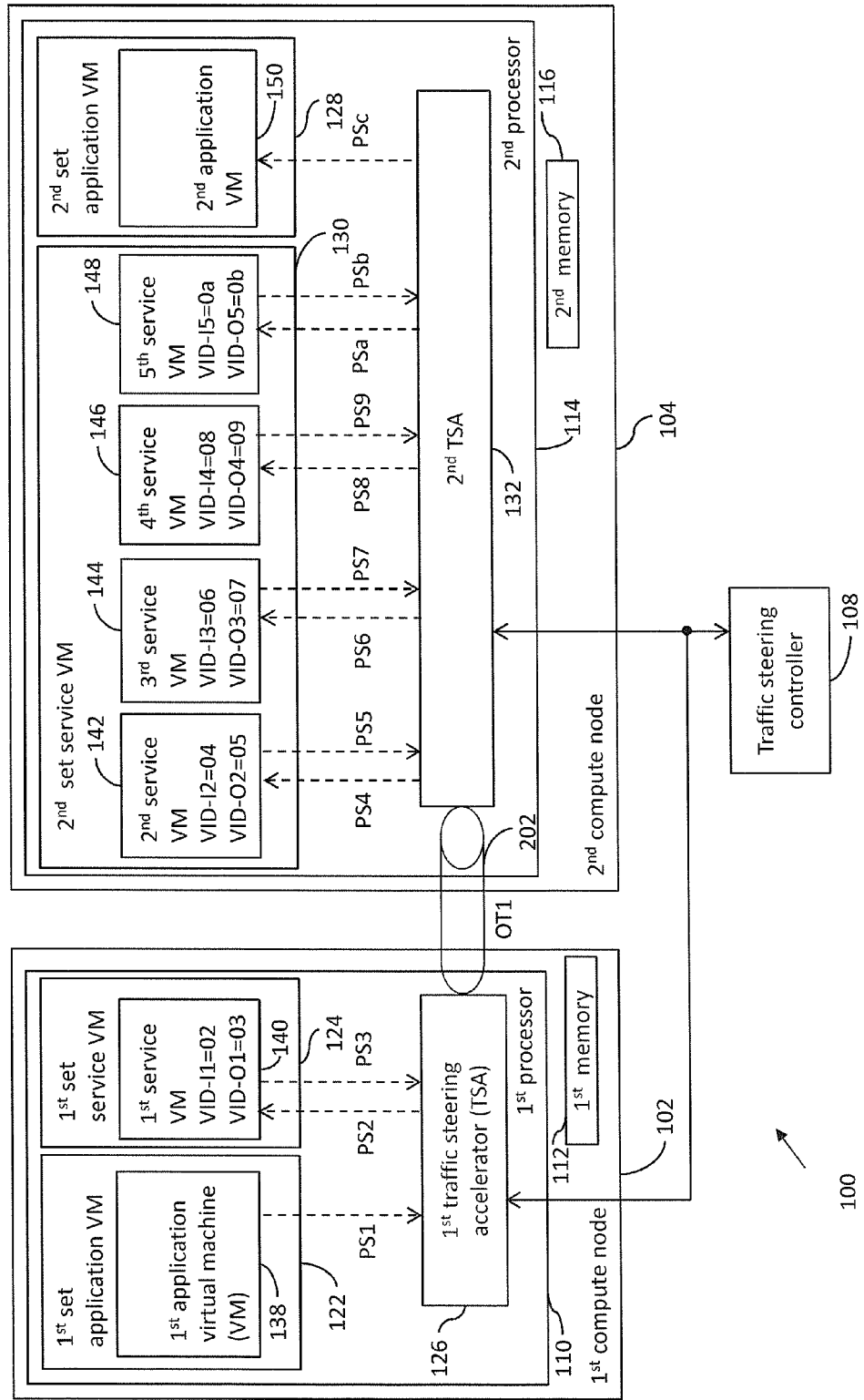
FIG. 2 is a schematic block diagram of the system of FIG. 1 for steering a data packet from a first compute node to a second compute node in accordance with an embodiment of the present invention.

Referring now to FIG. 2, a schematic block diagram of the system 100 for steering the first data packet from the first application VM 138 being executed on the first compute node 102 to the second application VM 150 being executed on the second compute node 104 is shown. In an example, the first data packet needs to be serviced by the first, third, and fourth service VMs 140, 144, and 146 prior to reception by the second application VM 150. In FIG. 2, the system 100 of FIG. 1 further includes an overlay network tunnel 202.

Figure 3:
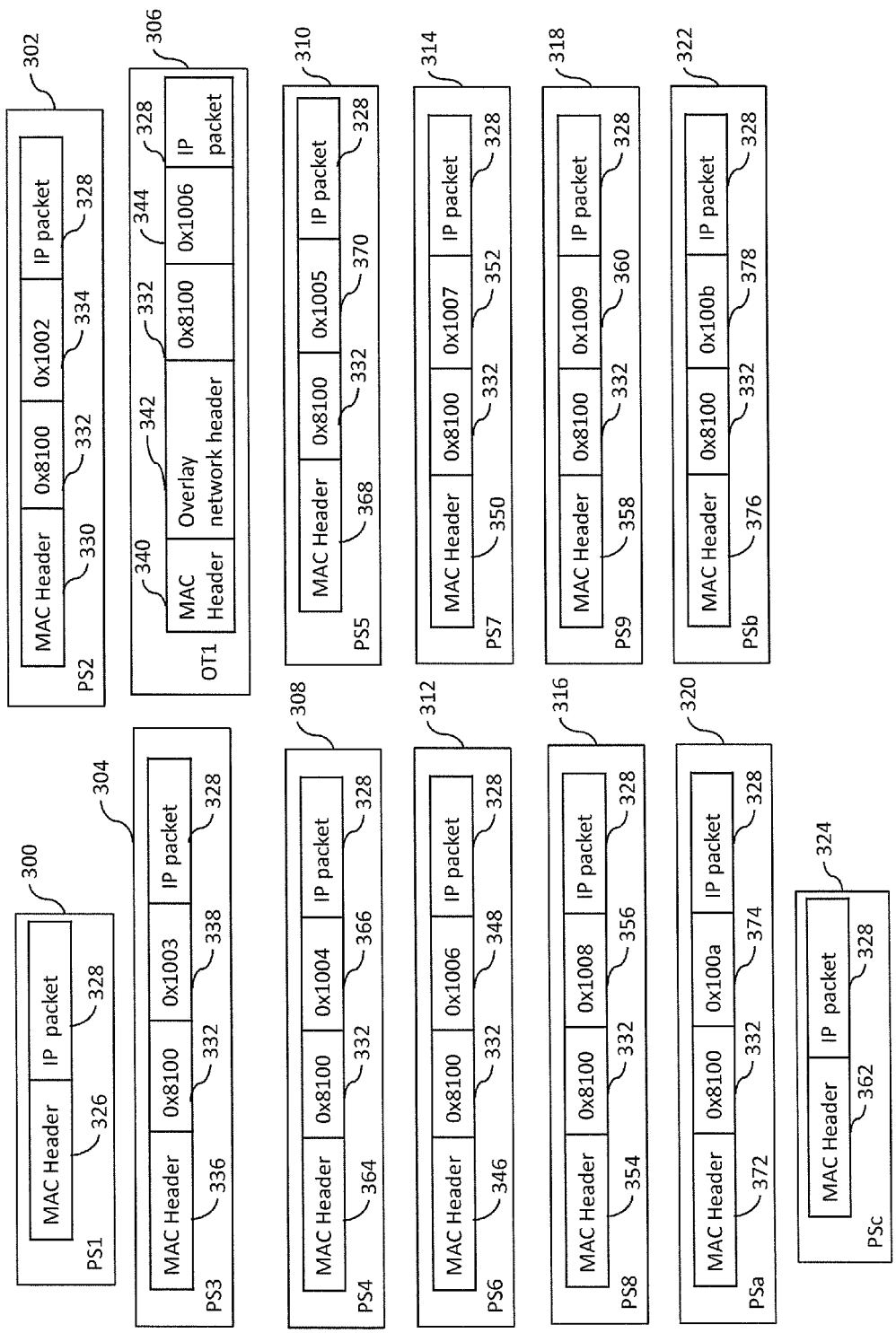
FIG. 3 is a diagram illustrating first through twelfth packet specifications and an overlay tunnel packet specification of a first data packet in accordance with an embodiment of the present invention.

FIG. 2 will be explained in conjunction with FIG. 3, which illustrates first through third packet specifications (PS1-PS3) 300-304, a first overlay tunnel packet specification (OT1) 306, and fourth through twelfth packet specifications (PS4-PSc) 308-324 of the first data packet.

The VLAN-ID assignment module 134 associates the first set of records with the first set of service VMs 124. The first record in the first set of records includes the first input VLAN-ID, the first output VLAN-ID, and the first port number. In the example, the first input VLAN-ID (also referred to as "VID-I1") has a value 02 and the first output VLAN-ID (also referred to as "VID-O1") has a value 03. Thus, the first service VM 140 is identified using the first input VLAN-ID value as 02 and the first output VLAN-ID value as 03. Subsequently, the VLAN-ID assignment module 134 associates the second set of records with the second set of service VMs 130. The second set of records includes the second record, the third record, a fourth record, and a fifth record. The second record in the second set of records includes the second input VLAN-ID (also referred to as "VID-I2"=04), the second output VLAN-ID (also referred to as "VID-O2"=05) and the second port number. Thus, the second service VM 142 is identified using the second input VLAN-ID value as 04 and the second output VLAN-ID value as 05. The third record includes a third input VLAN-ID (also referred to as "VID-I3"=06), a third output VLAN-ID (also referred to as "VID-O3"=07), and a third port number. The fourth record includes a fourth input VLAN-ID (also referred to as "VID-I4"=08), a fourth output VLAN-ID (also referred to as "VID-O4"=09), and a fourth port number. The fifth record includes a fifth input VLAN-ID (also referred to as "VID-I5"=0a), a fifth output VLAN-ID (also referred to as "VID-O5"=0b), and a fifth port number. Therefore, the third, fourth, and fifth service VMs 144, 146, and 148 are identified using the third input and output VLAN-ID values as 06 and 07, the fourth input and output VLAN-ID values as 08 and 09, and the fifth input and output VLAN-ID values as 10 and 11, respectively.

The first application VM 138 outputs the first data packet having the first packet specification (PS1) 300. The first data packet having the first packet specification (PS1) 300 includes a media access control (MAC) header 326 and an internet protocol (IP) packet 328. The IP packet 328 is the first data packet and the MAC header 326 includes a source MAC address and a destination MAC address. The source MAC address includes a MAC address of the first application VM 138 and the destination MAC address includes a MAC address of the first traffic steering accelerator 126. The first traffic steering accelerator 126 receives the first data packet having the first packet specification (PS1) 300. Since the first traffic steering accelerator 126 does not have any service chaining rules configured for the IP packet 328, the first traffic steering accelerator 126 transmits the IP packet 328 to the traffic steering controller 108. The traffic steering controller 108 identifies the first chain of records associated with the first n-tuple and outputs the first chain of records to the first traffic steering accelerator 126. In the example, the first chain of records includes the first record, the third record, and the fourth record. The first traffic steering accelerator 126 receives the first chain of records and retrieves the first record of the first chain of records. The first traffic steering accelerator 126 further retrieves the first input VLAN-ID (02) of the first record, adds the first input VLAN-ID (02) to the first data packet, and generates the first data packet having the second packet specification (PS2) 302. Since the first record is associated with the first service VM 140, the first traffic steering accelerator 126 transmits the first data packet having the second packet specification (PS2) 302 to the first service VM 140 utilizing the virtual port which corresponds to the first port number.

The first data packet having the second packet specification (PS2) 302 includes a MAC header 330, the VLAN protocol identifier field 332, a VLAN-ID field 334, and the IP packet 328. The MAC header 330 includes a source MAC address and a destination MAC address. The source MAC address is the MAC address of the first traffic steering accelerator 126 and the destination MAC address is a MAC address of the first service VM 140. The VLAN protocol identifier field 332 is given by 0x8100 that conforms to the IEEE 802.1Q standard. The VLAN-ID field 334 includes the first input VLAN ID (0x1002).

The first service VM 140 receives the first data packet having the second packet specification (PS2) 302, removes the first input VLAN-ID (02) from the second packet specification (PS2) 302, processes the IP packet 328 with the first service function, adds the first output VLAN-ID (03) to the first data packet, and generates the first data packet having the third packet specification (PS3) 304. The first data packet having the third packet specification (PS3) 304 includes a MAC header 336, the VLAN protocol identifier field 332, a VLAN-ID field 338, and the IP packet 328. The MAC header 336 includes a source MAC address and a destination MAC address. The source MAC address is the MAC address of the first service VM 140 and the destination MAC address is the MAC address of the first traffic steering accelerator 126. The VLAN-ID field 338 includes the first output VLAN ID (0x1003). The first service VM 140 transmits the first data packet having the third packet specification (PS3) 304 to the first traffic steering accelerator 126.

The first traffic steering accelerator 126 receives the first data packet having the third packet specification (PS3) 304 and removes the first output VLAN-ID (03) from the first data packet having the third packet specification (PS3) 304. The first traffic steering accelerator 126 identifies the first record of the first chain of records based on the first output VLAN-ID (03) and checks to determine if a next record is included in the first chain of records that is subsequent to the first record. When the subsequent record is identified as the third record, the first traffic steering accelerator 126 further retrieves the third input VLAN-ID (06) of the third record and adds the third input VLAN-ID (06) to the first data packet. Since the third record is associated with the third service VM 144, the first traffic steering accelerator 126 transmits the first data packet utilizing the overlay network tunnel 202. To transmit the first data packet on the overlay network tunnel 202, the first traffic steering accelerator 126 further adds an overlay network header to the first data packet, thereby generating the first data packet having the first overlay tunnel packet specification (OT1) 308. The first data packet having the first overlay tunnel packet specification (OT1) 308 includes a MAC header 340, the overlay network header 342, the VLAN protocol identifier field 332, a VLAN-ID field 344, and the IP packet 328. The MAC header 340 includes a source MAC address and a destination MAC address. The source MAC address is the MAC address of the first traffic steering accelerator 126 and the destination MAC address is a MAC address of the second traffic steering accelerator 132. The VLAN-ID field 344 includes the third input VLAN ID (0x1006). The overlay network header 342 includes the protocol specification based on the protocol that is used for transmitting the first data packet having the first overlay tunnel packet specification (OT1) 308 through the overlay network tunnel 202.

The second traffic steering accelerator 132 receives the first data packet having the first overlay tunnel packet specification (OT1) 308 from the first traffic steering accelerator 126. Since the second traffic steering accelerator 132 does not have any chain of records associated with the IP packet 328, the second traffic steering accelerator 132 transmits the first data packet to the traffic steering controller 108. The traffic steering controller 108 programs the first chain of records in the second traffic steering accelerator 132. The second traffic steering accelerator 132 retrieves the third record from the first chain of records based on the third input VLAN-ID (06) of the first data packet. Since the third record corresponds to the third service VM 144, the second traffic steering accelerator 132 generates the first data packet having the sixth packet specification (PS6) 312.

The first data packet having the sixth packet specification (PS6) 312 includes a MAC header 346, the VLAN protocol identifier field 332, a VLAN-ID field 348, and the IP packet 328. The MAC header 346 includes a source MAC address and a destination MAC address. The source MAC address is the MAC address of the second traffic steering accelerator 132 and the destination MAC address is a MAC address of the third service VM 144. The VLAN-ID field 348 includes the third input VLAN ID (0x1006). The second traffic steering accelerator 132 transmits the first data packet having the sixth packet specification (PS6) 312 to the third service VM 144 of the second set of service VMs 130 based on the third input VLAN-ID (06). Since the second processor 114 executes the second, third, fourth, and fifth service VMs 142, 144, 146, and 148, based on the input VLAN-ID added to the first data packet, the second traffic steering accelerator 132 determines the service VM out of the second set of service VMs 130 that receives the first data packet based on the input VLAN-ID. Thus, based on the input VLAN-ID added to the first data packet, the second traffic steering accelerator 132 precisely identifies the service VM for processing the first data packet.

The third service VM 144 receives the first data packet having the sixth packet specification (PS6) 312 from the second traffic steering accelerator 132. The third service VM 144 removes the third input VLAN-ID (06) from the first data packet having the sixth packet specification (PS6) 312, processes the IP packet 328 with a third service function, adds the third output VLAN-ID (07) to the first data packet, and generates the first data packet having the seventh packet specification (PS7) 314. The third service VM 144 transmits the first data packet having the seventh packet specification (PS7) 314 to the second traffic steering accelerator 132. The first data packet having the seventh packet specification (PS7) 314 includes a MAC header 350, the VLAN protocol identifier field 332, a VLAN-ID field 352, and the first data packet field 328. The MAC header 350 includes a source MAC address and a destination MAC address. The source MAC address is the MAC address of the third service VM 144 and the destination MAC address is the MAC address of the second traffic steering accelerator 132. The VLAN-ID field 352 includes the third output VLAN ID (0x1007). The second traffic steering accelerator 132 receives the first data packet having the seventh packet specification (PS7) 314 and removes the third output VLAN-ID (07) from the first data packet having the seventh packet specification (PS7) 314. The second traffic steering accelerator 132 identifies the third record of the first chain of records based on the third output VLAN-ID (07) and checks to determine if the first chain of records includes another record subsequent to the third record. On identifying the fourth record as the subsequent record, the second traffic steering accelerator 132 retrieves the fourth input VLAN-ID (08) of the fourth record, adds the fourth input VLAN-ID (08) to the first data packet, and generates the first data packet having the eighth packet specification (PS8) 316. Since the fourth record is associated with the fourth service VM 146, the second traffic steering accelerator 132 transmits the first data packet having the eighth packet specification (PS8) 316 utilizing a virtual port that corresponds to the fourth port number.

Thus, the first data packet having the eighth packet specification (PS8) 316 includes a MAC header 354, the VLAN protocol identifier field 332, a VLAN-ID field 356, and the first data packet field 328. The MAC header 354 includes a source MAC address and a destination MAC address. The source MAC address is the MAC address of the second traffic steering accelerator 132 and the destination MAC address is a MAC address of the fourth service VM 146. The VLAN-ID field 356 includes the fourth input VLAN ID (0x1008).

The fourth service VM 146 receives the first data packet having the eighth packet specification (PS8) 316 from the second traffic steering accelerator 132. The fourth service VM 146 removes the fourth input VLAN-ID (08) from the first data packet having the eighth packet specification (PS8) 316, processes the IP packet 328 with a fourth service function, adds the fourth output VLAN-ID (09) to the first data packet, and generates the first data packet having the ninth packet specification (PS9) 318. The first data packet having the ninth packet specification (PS9) 318 includes the fourth output VLAN-ID (09). The fourth service VM 146 transmits the first data packet having the ninth packet specification (PS9) 318 to the second traffic steering accelerator 132.

Thus, the first data packet having the ninth packet specification (PS9) 318 includes a MAC header 358, the VLAN protocol identifier field 332, a VLAN-ID field 360, and the first data packet field 328. The MAC header 358 includes a source MAC address and a destination MAC address. The source MAC address is the MAC address of the fourth service VM 146 and the destination MAC address is the MAC address of the second traffic steering accelerator 132. The VLAN-ID field 360 includes the fourth output VLAN ID (0x1009).

The second traffic steering accelerator 132 receives the first data packet having the ninth packet specification (PS9) 318 and removes the fourth output VLAN-ID (09) from the first data packet having the ninth packet specification (PS9) 318. The second traffic steering accelerator 132 identifies the fourth record of the first chain of records based on the fourth output VLAN-ID (09) and checks to determine if the first chain of records includes yet another record subsequent to the fourth record. On determining that no more records are included in the first chain of records, the second traffic steering accelerator 132 generates the first data packet having the twelfth packet specification (PSc) 324 and transmits the first data packet having the twelfth packet specification (PSc) 324 to the second application VM 150.

The first data packet having the twelfth packet specification (PSc) 324 includes a MAC header 362 and the IP packet 328. The MAC header 362 includes a source MAC address and a destination MAC address. The source MAC address is the MAC address of the second traffic steering accelerator 132 and the destination MAC address is a MAC address of the second application VM 150.

In another example, the first data packet has to be processed with the first, second, and fifth service VMs 140, 142, and 148. Thus, a second chain of records is generated for the IP packet 328. The second chain of records includes the first record, the second record, and the fifth record. Thus, when the first application VM 138 outputs the first data packet having the first packet specification (PS1) 302 to the first traffic steering accelerator 126, the first traffic steering accelerator 126 provides the IP packet 328 to the traffic steering controller 108. The traffic steering controller 108 configures the second chain of records in the first traffic steering accelerator 126. The first traffic steering accelerator 126 thus retrieves the first input VLAN-ID (02) from the first record, adds the first input VLAN-ID (02) to the first data packet, generates the first data packet having the second packet specification (PS2) 302, and transmits the first data packet having the second packet specification (PS2) 302 to the first service VM 140. The first service VM 140 removes the first input VLAN-ID (02) from the first data packet having the second packet specification (PS2) 302, processes the IP packet 328 with the first service function, adds the first output VLAN-ID (03) to the first data packet, generates the first data packet having the third packet specification (PS3) 304, and transmits the first data packet having the third packet specification (PS3) 304 to the first traffic steering accelerator 126.

The first traffic steering accelerator 126 receives the first data packet having the third packet specification (PS3) 304, identifies the subsequent record as the second record in the second chain of records based on the first record, adds the second input VLAN-ID (04) to the first data packet, generates the first data packet having a second overlay network tunnel packet specification (OT2) (not shown), and transmits the first data packet having the second overlay tunnel packet specification (OT2) to the second traffic steering accelerator 132. The second traffic steering accelerator 132 receives the first data packet having the second overlay tunnel packet specification (OT2), transmits the IP packet 328 to the traffic steering controller 108, receives the second chain of records from the traffic steering controller 108, adds the second input VLAN-ID (04) to the first data packet, generates the first data packet having the fourth packet specification (PS4) 308, and transmits the first data packet having the fourth packet specification (PS4) 308 to the second service VM 142.

Thus, the first data packet having the fourth packet specification (PS4) 308 includes a MAC header 364, the VLAN protocol identifier field 332, a VLAN-ID field 366, and the IP packet 328. The MAC header 364 includes a source MAC address and a destination MAC address. The source MAC address is the MAC address of the second traffic steering accelerator 132 and the destination MAC address is a MAC address of the second service VM 142. The VLAN-ID field 366 includes the second input VLAN ID (0x1004).

The second service VM 142 receives the first data packet having the fourth packet specification (PS4) 308, removes the second input VLAN-ID (04) from the first data packet having the fourth packet specification (PS4) 308, processes the IP packet 328 with the second service function, adds the second output VLAN-ID (05) to the first data packet, and generates the first data packet having the fifth packet specification (PS5) 310.

Thus, the first data packet having the fifth packet specification (PS5) 310 includes a MAC header 368, the VLAN protocol identifier field 332, a VLAN-ID field 370, and the IP packet 328. The MAC header 368 includes a source MAC address and a destination MAC address. The source MAC address is the MAC address of the second service VM 142 and the destination MAC address is the MAC address of the second traffic steering accelerator 132. The VLAN-ID field 370 includes the second output VLAN ID (0x1005).

The second traffic steering accelerator 132 receives the first data packet having the fifth packet specification (PS5)

310 and removes the second output VLAN-ID (05) from the first data packet having the fifth packet specification (PS5) 310. The second traffic steering accelerator 132 identifies the fifth record of the second chain of records based on the second output VLAN-ID (05). On identifying the fifth record, the second traffic steering accelerator 132 retrieves the fifth input VLAN-ID (0a) of the fifth record, adds the fifth input VLAN-ID (0a) to the first data packet, and generates the first data packet having the tenth packet specification (PSa) 320. Since the fifth record is associated with the fifth service VM 148, the second traffic steering accelerator 132 transmits the first data packet having the tenth packet specification (PSa) 320 utilizing the fifth port number.

Thus, the first data packet having the tenth packet specification (PSa) 320 includes a MAC header 372, the VLAN protocol identifier field 332, a VLAN-ID field 374, and the IP packet 328. The MAC header 372 includes a source MAC address and a destination MAC address. The source MAC address is the MAC address of the second traffic steering accelerator 132 and the destination MAC address is a MAC address of the fifth service VM 148. The VLAN-ID field 374 includes the fifth input VLAN ID (0x100a).

The fifth service VM 148 receives the first data packet having the tenth packet specification (PSa) 320, removes the fifth input VLAN-ID (0a) from the first data packet having the fifth packet specification (PSa) 320, processes the IP packet 328 with a fifth service function, adds the fifth output VLAN-ID (0b) to the first data packet, and generates the first data packet having the eleventh packet specification (PSb) 322.

Thus, the first data packet having the eleventh packet specification (PSb) 322 includes a MAC header 376, the VLAN protocol identifier field 332, a VLAN-ID field 378, and the IP packet 328. The MAC header 376 includes a source MAC address and a destination MAC address. The source MAC address is the MAC address of the fifth service VM 148 and the destination MAC address is the MAC address of the second traffic steering accelerator 132. The VLAN-ID field 378 includes the fifth output VLAN ID (0x100b).

The second traffic steering accelerator 132 receives the first data packet having the eleventh packet specification (PSb) 322 and removes the fifth output VLAN-ID (0b) from the first data packet having the eleventh packet specification (PSb) 322. The second traffic steering accelerator 132 identifies the fifth record of the second chain of records based on the fifth output VLAN-ID (0b) and checks to determine if the second chain of records includes yet another record subsequent to the fifth record. On determining that no more records are included in the second chain of records, the second traffic steering accelerator 132 generates the first data packet having the twelfth packet specification (PSc) 324 and transmits the first data packet having the twelfth packet specification (PSc) 324 to the second application VM 150.

Figure 4:
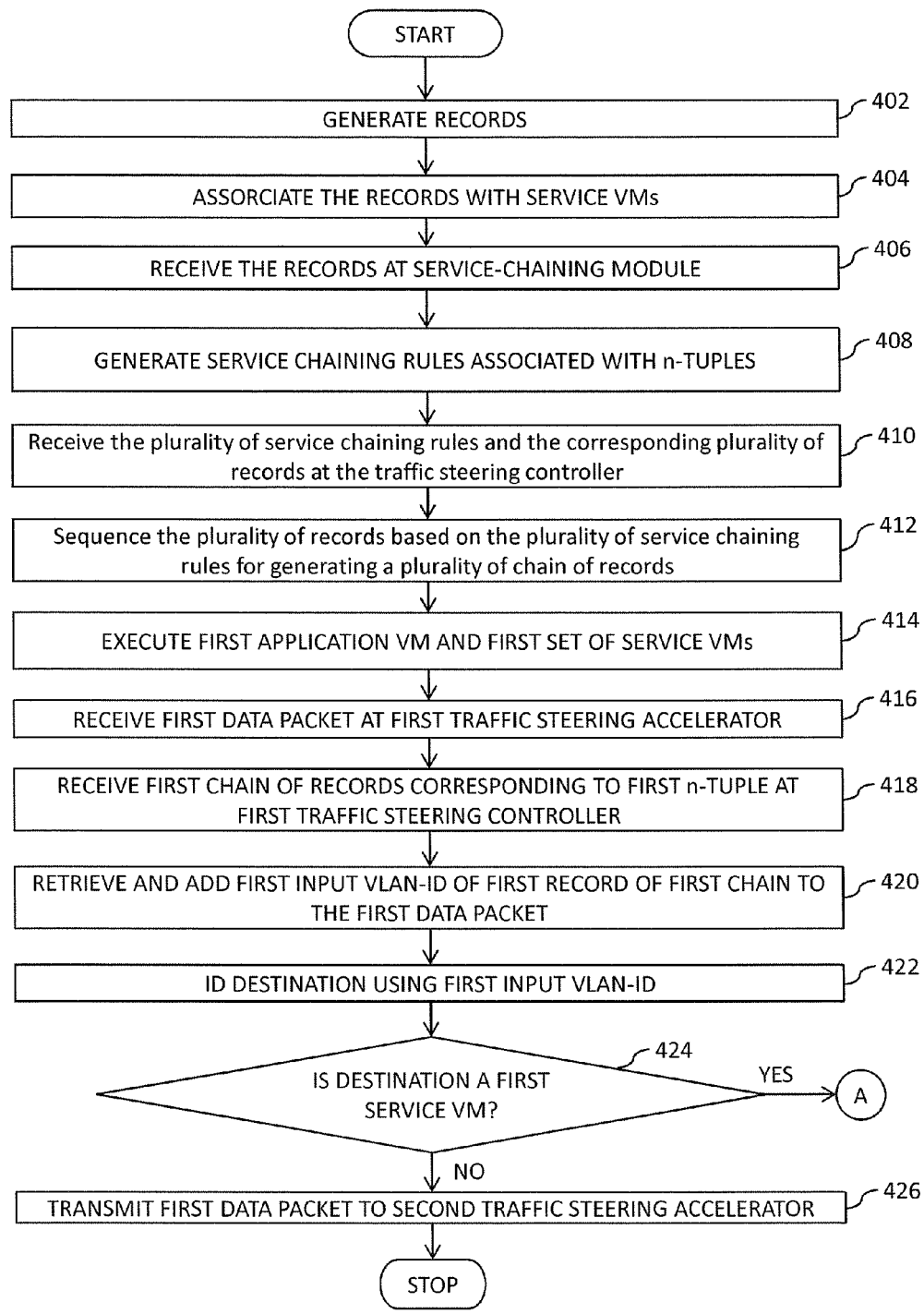
FIG. 4 is a flow chart illustrating a method for steering data packets in a communication network in accordance with an embodiment of the present invention.

Referring now to FIG. 4, a flow chart illustrating a method for steering the data packets in accordance with an embodiment of the present invention is shown. At step 402, the VLAN-ID assignment module 134 generates the multiple records. At step 404, the VLAN-ID assignment module 134 associates the multiple records with the multiple service VMs. At step 406, the service chaining module 136 receives the multiple records. At step 408, the service chaining module 136 generates the multiple service chaining rules associated with the multiple n-Tuples. At step 410, the traffic steering controller 108 receives the multiple service chaining rules and the corresponding multiple records from the service chaining module 136. At step 412, the traffic steering controller 108 sequences the multiple records based on the multiple service chaining rules and generates the multiple chain of records. At step 414, the first processor 110 executes the first application VM 138 of the first set of application VMs 122 and the first service VM 140 of the first set of service VMs 124. At step 416, the first traffic steering accelerator 126 receives the first data packet. At step 418, the first traffic steering accelerator 126 receives the first chain of records corresponding to the first n-Tuple. At step 420, the first traffic steering accelerator 126 retrieves and adds the first input VLAN-ID of the first record of the first chain of records with the first data packet. At step 422, the first traffic steering accelerator 126 identifies a destination based on the first input VLAN-ID. At step 424, the first traffic steering accelerator 126 checks to determine whether the destination of the first data packet is the first service VM 140. If the first traffic steering accelerator 126 determines that the destination of the first data packet is the first service VM 140, step 502 is executed. If at step 424, the first traffic steering accelerator 126 determines that the destination of the first data packet is not the first service VM 140, step 426 is executed. At step 426, the first data packet is transmitted to the second traffic steering accelerator 132 by way of the overlay network tunnel 202.

Figure 5:
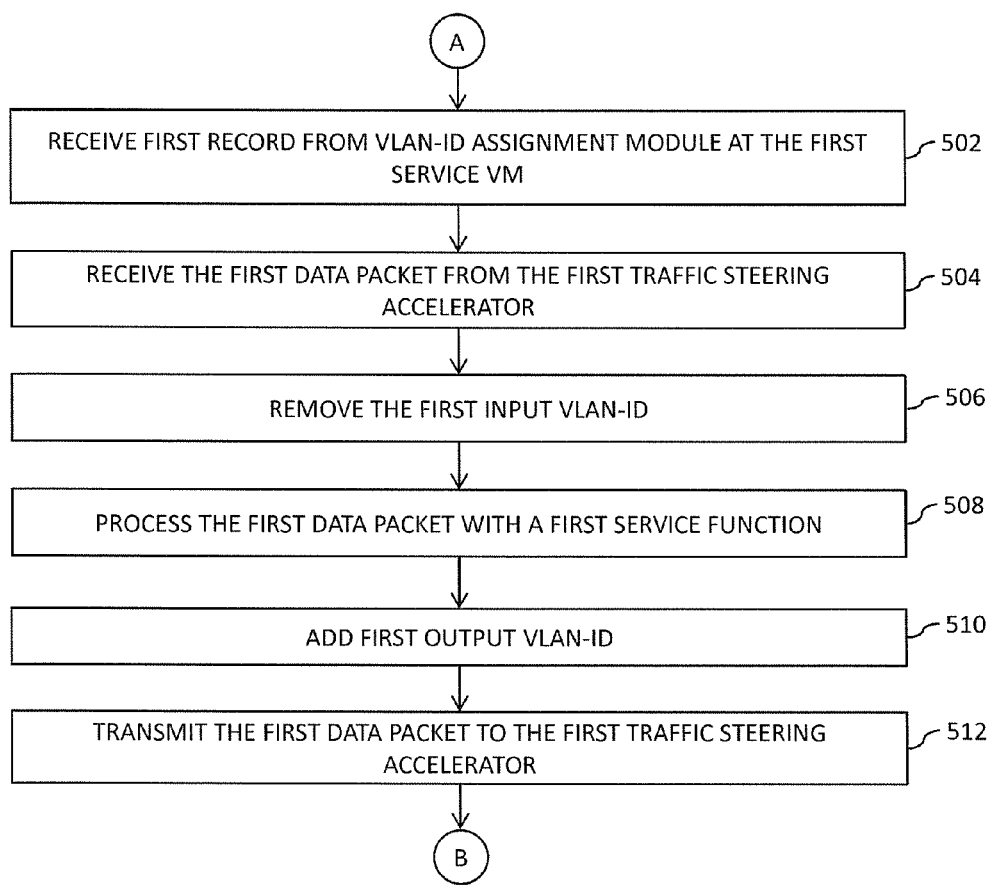
FIG. 5 is a flow chart illustrating a method for processing a data packet 2 by a first service VM in accordance with an embodiment of the present invention.

Referring now to FIG. 5, a flow chart illustrating a method of processing the first data packet by the first service VM 140 is shown. At step 502, the first service VM 140 receives the first record from the VLAN-ID assignment module 134. At step 504, the first service VM 140 receives the first data packet from the first traffic steering accelerator 126. At step 506, the first service VM 140 removes the first input VLAN-ID added to the first data packet. At step 508, the first data packet is processed with the first service function. At step 510, the first output VLAN-ID is added to the first data packet. At step 512, the first data packet is transmitted to the first traffic steering accelerator 126.

Figure 6:
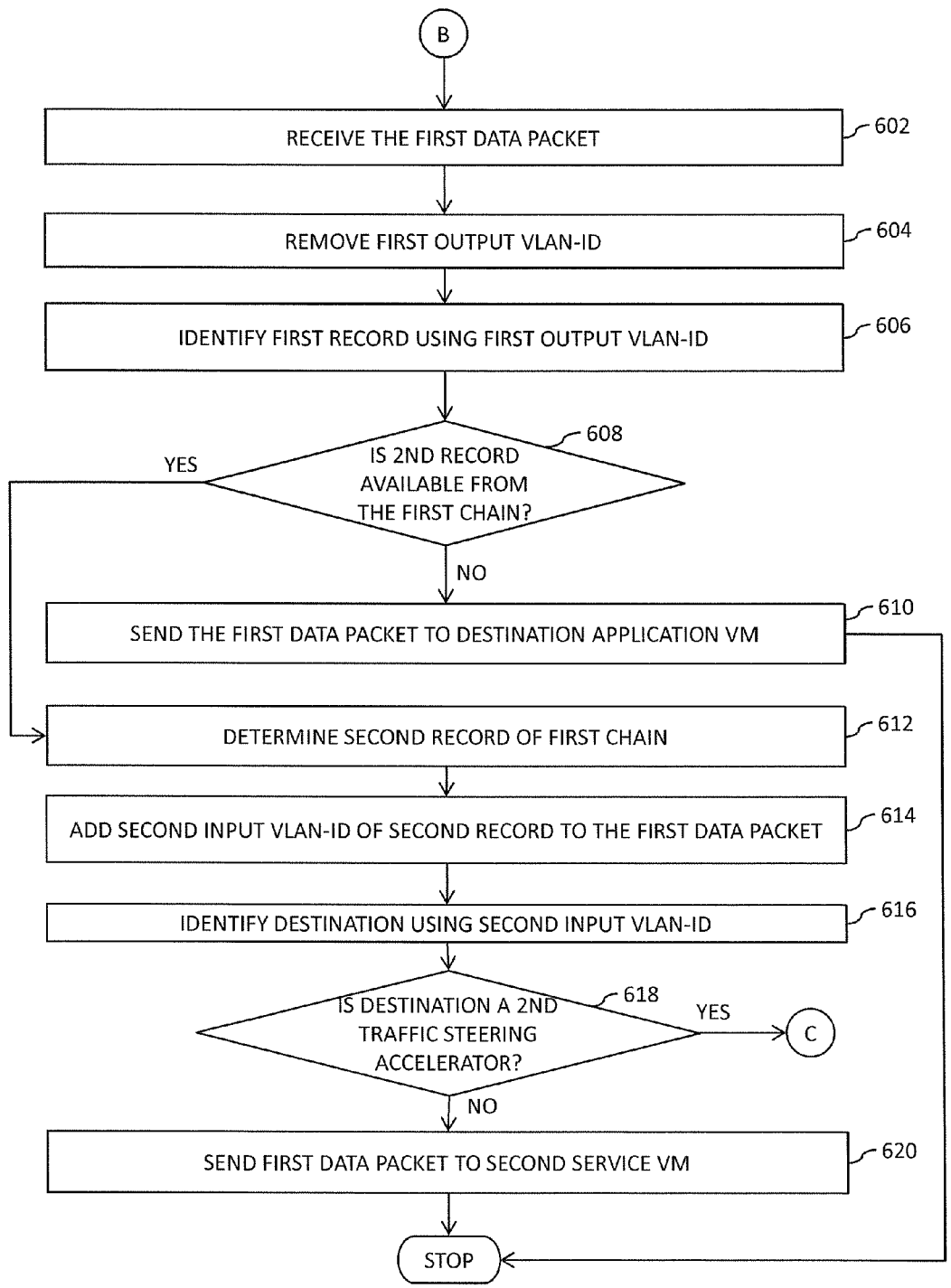
FIG. 6 is a flow chart illustrating a method for processing a data packet by a first traffic steering accelerator in accordance with an embodiment of the present invention.

Referring now to FIG. 6, a flow chart illustrating a method of processing the first data packet by the first traffic steering accelerator 126 on receiving the first data packet from the first service VM 140 is shown. At step 602, the first data packet is received by the first traffic steering accelerator 126. At step 604, the first traffic steering accelerator 126 removes the first output VLAN-ID added to the first data packet. At step 606, the first record of the first chain of records is identified based on the first output VLAN-ID. At step 608, the first traffic steering accelerator 126 determines if the second record is available from the first chain of records. If at step 608, the first traffic steering accelerator 126 determines that the second record is not available from the first chain of records, step 610 is executed. At step 610, the first data packet is sent to a destination application VM in the first set of application VMs 122. However, if at step 608, the first traffic steering accelerator 126 determines that the second record is available from the first chain of records, step 612 is executed. At step 612, the first traffic steering accelerator 126 determines the second record of the first chain of records subsequent to the first record. At step 614, the second input VLAN-ID of the second record is added to the first data packet. At step 616, the first traffic steering accelerator 126 determines if the destination of the first data packet is the second traffic steering accelerator 132. If at step 616, the first traffic steering accelerator 126 determines that the destination of the first data packet is the second traffic steering accelerator 132, step 702 is executed. However, if at step 616, the first traffic steering accelerator 126 determines that the destination of the first data packet is not the second traffic steering accelerator 132, step 620 is executed. At step 620, the first data packet is sent to a service VM of the first set of service VMs 124.

Figure 7:
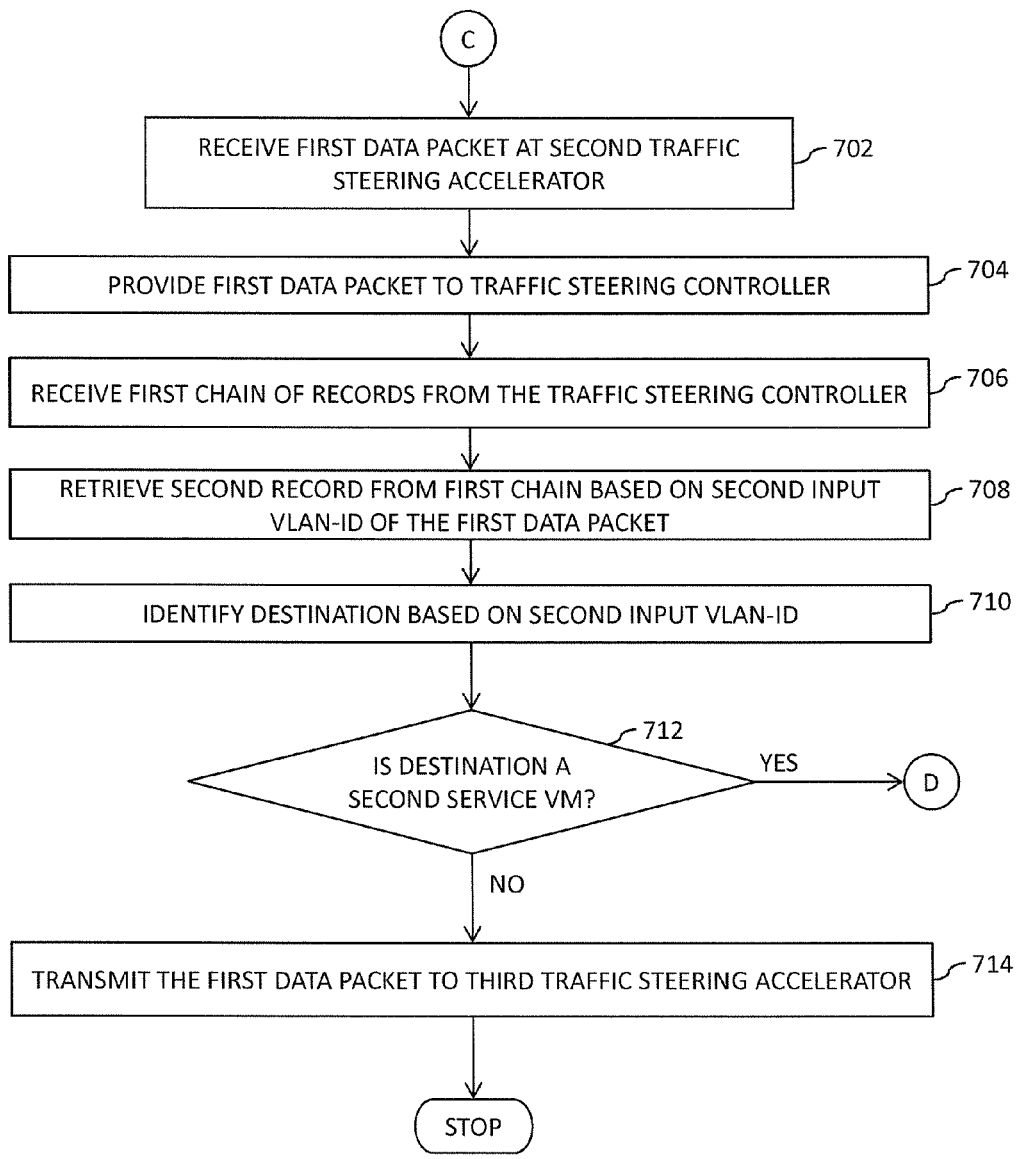
FIG. 7 is a flow chart illustrating a method for determining a destination for a data packet based on an input VLAN-ID in accordance with an embodiment of the present invention.

Referring now to FIG. 7, a flow chart illustrating a method for determining a destination for the IP packet 328 based on a second input VLAN-ID thereof by the second traffic steering accelerator 132 in accordance with an embodiment of the present invention is shown. At step 702, the first data packet is received at the second traffic steering accelerator 132. At step 704, the second traffic steering accelerator 132 provides the first data packet to the traffic steering controller 108. At step 706, the first chain of records is received by the second traffic steering accelerator 132 from the traffic steering controller 108. At step 708, the second traffic steering accelerator 132 retrieves the second record from the first chain of records based on the second input VLAN-ID of the first data packet. At step 710, a destination is identified based on the second input VLAN-ID. At step 712, the second traffic steering accelerator 132 determines if the destination of the first data packet is the second service VM 142. If at step 712, the second traffic steering accelerator 132 determines that the destination of the first data packet is not the second service VM 142, step 714 is executed. At step 714, the first data packet is transmitted to the third traffic steering accelerator (not shown). However, if at step 712, the second traffic steering accelerator 132 determines that the destination of the first data packet is the second service VM 142, step 802 is executed.

Figure 8:
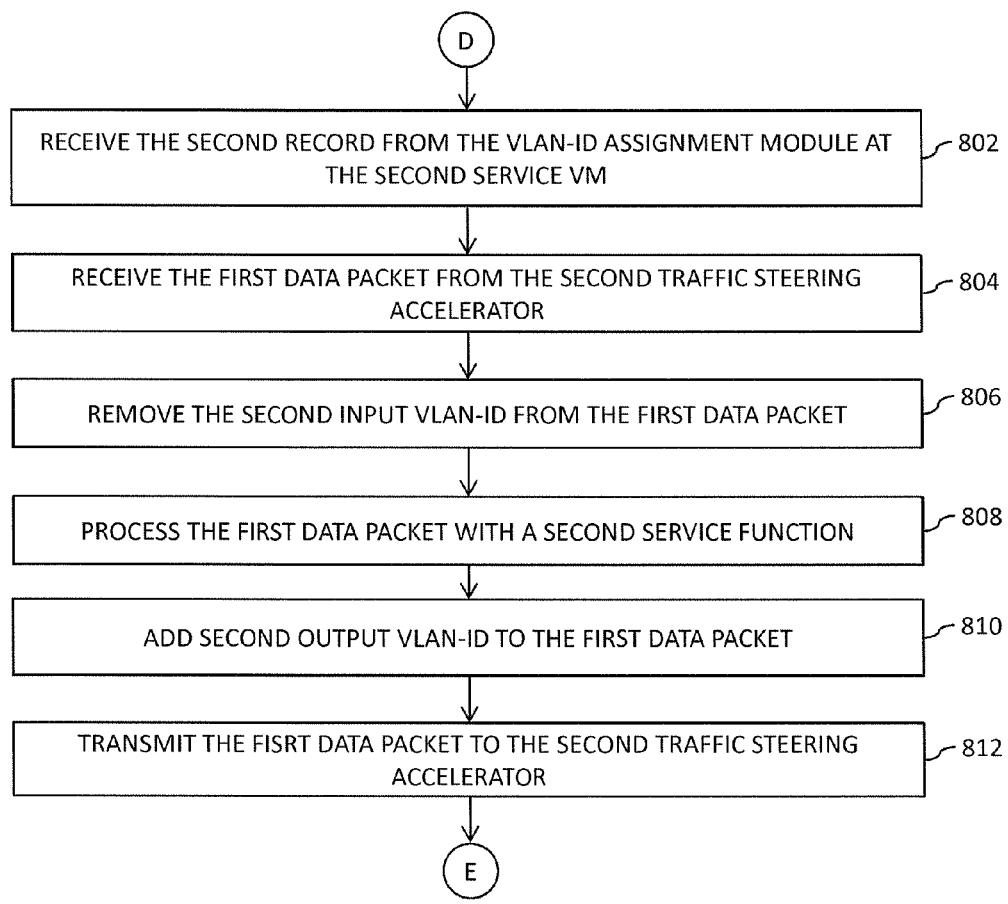
FIG. 8 is a flow chart illustrating a method of processing a data packet by a second service VM in accordance with an embodiment of the present invention.

Referring now to FIG. 8, a flow chart illustrating a method of processing the first data packet by the second service VM 142 in accordance with an embodiment of the present invention is shown. At step 802, the second service VM 142 receives the second record from the VLAN-ID assignment module 134. The second record includes the second input VLAN-ID, the second output VLAN-ID, and the second port number. At step 804, the second service VM 142 receives the first data packet from the second traffic steering accelerator 132. At step 806, the second traffic steering accelerator 132 removes the second input VLAN-ID added to the first data packet. At step 808, the first data packet is processed with the second service function. At step 810, the second output VLAN-ID is added to the first data packet. At step 812, the first data packet is transmitted to the second traffic steering accelerator 132.

Figure 9A:
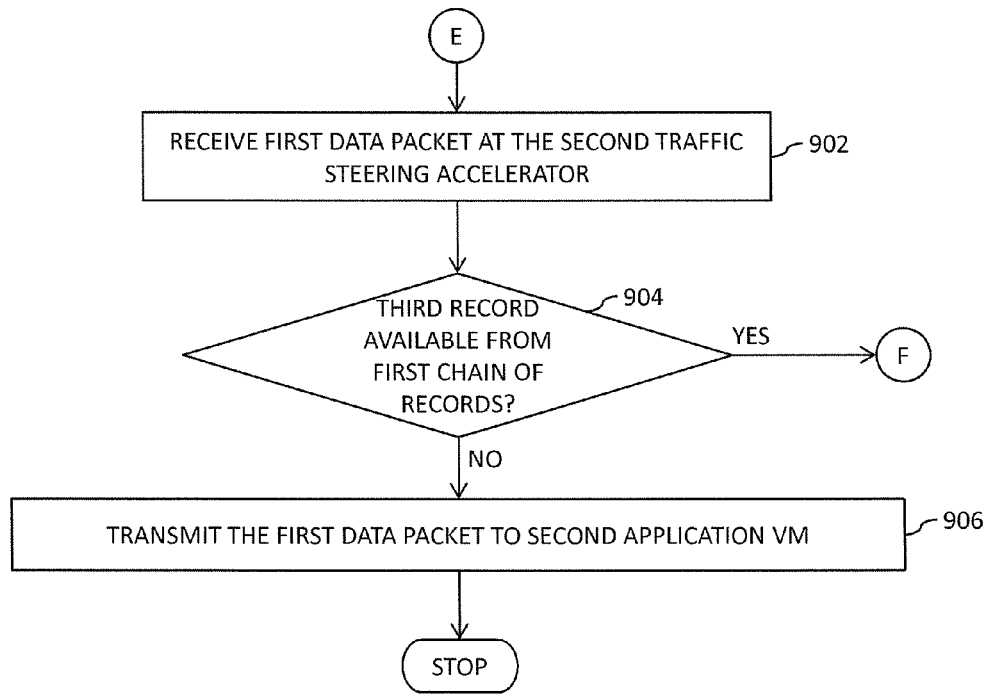
FIGS. 9A and 9B are a flow chart illustrating a method of determining a destination for a data packet by a traffic steering accelerator in accordance with an embodiment of the present invention.
Figure 9B:
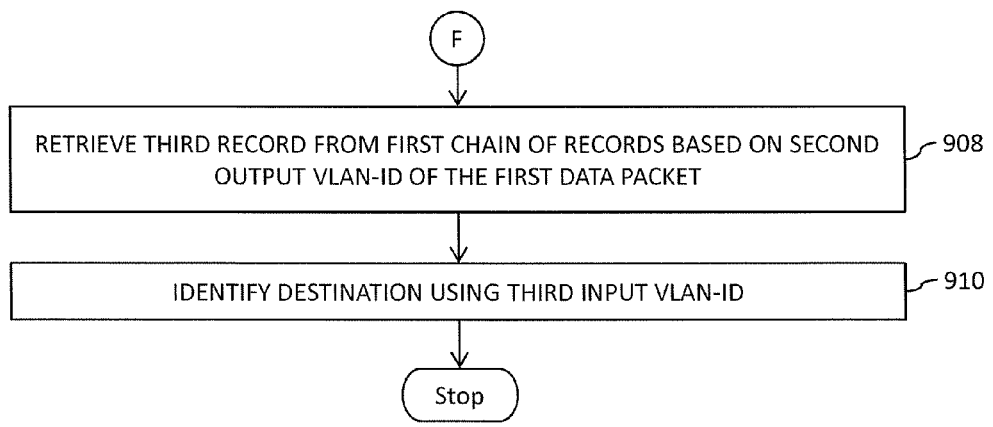

Referring now to FIGS. 9A and 9B, flow charts illustrating a method of determining a destination for the first data packet by the second traffic steering accelerator 132 on receiving the first data packet from the second service VM 142 is shown. At step 902, the first data packet is received at the second traffic steering accelerator 132. At step 904, the second traffic steering accelerator 132 determines if the third record is available from the first chain of records. If at step 904, the second traffic steering accelerator 132 determines that the third record is not available from the first chain of records, step 906 is executed. At step 906, the first data packet is transmitted to the second application VM 150. However, if at step 904, the second traffic steering accelerator 132 determines that the third record is available from the first chain of records, step 908 is executed. At step 908, the second traffic steering accelerator 132 retrieves the third record from the first chain of records based on the second output VLAN-ID of the first data packet. At step 910, a destination based on the third input VLAN-ID is identified for the first data packet.

Thus, by embedding the VLAN-IDs in the data packet, the subsequent service VM amongst the multiple service VMs hosted by a given single compute node for the layer 2 transparent networks can be determined. The system 100 does not define any new network protocols in the header of the data packets to identify the subsequent service VM in the service chain. The system 100 also eliminates the need of upgrading software and hardware in the compute node and utilizes existing networking mechanisms for configuring the VLAN-ID information. Since the records in the service chain are ordered, the time required for determining the subsequent service VM for processing the data packet is less. Moreover, the traffic steering controller 108 evenly distributes and assigns the data packets to be processed by the multiple service VMs, thereby reducing the processing load caused due to the transmission of the data packets in the communication network. Since the system 100 does not use any network ports to identify the next service VM, the system 100 provides a scalable solution for steering data packets. Furthermore, the system 100 provides excellent performance characteristics and provides easy implementation in fast path accelerators for the L2 transparent networks.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for steering data packets in a communication network, the system comprising:
   a plurality of compute nodes having a corresponding plurality of processors for executing a plurality of application and service virtual machines (VMs) and a corresponding plurality of traffic steering accelerators, wherein a first compute node includes:
      a first processor configured for executing a first application VM and a first set of service VMs, wherein the first application VM outputs a first data packet; and
      a first traffic steering accelerator connected to the first processor for receiving the first data packet;
   a virtual local area network-identifier (VLAN-ID) assignment module for generating a plurality of records and associating the plurality of records with the plurality of service VMs, wherein each record includes a VLAN-ID set and a port number of a corresponding service VM, and wherein the VLAN-ID set includes input and output VLAN-IDs of the corresponding service VM;
   a service-chaining module connected to the VLAN-ID assignment module for receiving the plurality of records and generating a plurality of service chaining rules associated with a plurality of n-Tuples configured for the plurality of application VMs; and
   a traffic steering controller connected to the first traffic steering accelerator for receiving the first data packet, and to the service-chaining module for receiving the plurality of service chaining rules and the corresponding plurality of records, sequencing the plurality of records based on the plurality of service chaining rules for generating a plurality of chained records, and outputting a first chain of the chained records corresponding to a first n-Tuple based on the first data packet, wherein the first traffic steering accelerator receives the first chain of chained records and is configured to perform the steps of:
      retrieving a first record of the first chain of chained records;
      retrieving a first input VLAN-ID of the first record;

adding the first input VLAN-ID to the first data packet; and transmitting the first data packet to at least one of a first service VM and a second traffic steering accelerator based on the first input VLAN-ID.

2. The system of claim 1, wherein the VLAN-ID assignment module stores a mapping between a plurality of port numbers corresponding to the plurality of service VMs, a corresponding plurality of virtual networks, and a corresponding plurality of VLAN-ID sets in a first memory.

3. The system of claim 1, wherein each n-Tuple comprises a 5-Tuple that includes a source internet protocol (IP) address, a destination IP address, a source port number, a destination port number, and protocol information of a corresponding one of the application VMs.

4. The system of claim 1, wherein the traffic steering controller comprises an OpenFlow controller and each traffic steering accelerator comprises an OpenFlow switch.

5. The system of claim 1, wherein the VLAN-ID assignment module provides a first set of the records to the first processor, wherein the first set of records corresponds to the first set of service VMs.

6. The system of claim 5, wherein the first processor further executes a network service configuration module for configuring VLAN interfaces of the first set of service VMs based on the corresponding first set of records.

7. The system of claim 6, wherein the first service VM is configured for:

receiving the first record from the VLAN-ID assignment module, wherein the first record includes the first input VLAN-ID, a first output VLAN-ID, and a first port number, receiving the first data packet from the first traffic steering accelerator, removing the first input VLAN-ID from the first data packet, processing the first data packet with a first service function, adding the first output VLAN-ID to the first data packet, and transmitting the first data packet to the first traffic steering accelerator.

8. The system of claim 7, wherein the first traffic steering accelerator further:

removes the first output VLAN-ID added to the first data packet, identifies the first record of the first chain of records based on the first output VLAN-ID, determines a second record from the first chain of records subsequent to the first record, determines a second input VLAN-ID of the second record, adds the second input VLAN-ID to the first data packet, and transmits the first data packet to at least one of the first set of service VMs and the second traffic steering accelerator based on the second input VLAN-ID.

9. The system of claim 8, wherein a second compute node includes a second processor and the second traffic steering accelerator, and wherein the second processor executes a second application VM and a second set of service VMs.

10. The system of claim 9, wherein the second traffic steering accelerator is configured for:

receiving the first data packet from the first traffic steering accelerator, providing the first data packet to the traffic steering controller, receiving the first chain of records from the traffic steering controller, retrieving the second record from the first chain of records based on the second input VLAN-ID of the first data packet, and transmitting the first data packet to a second service VM of the second set of service VMs based on the second input VLAN-ID.

11. The system of claim 10, wherein the first traffic steering accelerator transmits the first data packet to the second traffic steering accelerator using a network overlay protocol.

12. The system of claim 11, wherein the second service VM is configured for:

receiving the second record from the VLAN-ID assignment module, wherein the second record includes the second input VLAN-ID, a second output VLAN-ID, and a second port number, receiving the first data packet from the second traffic steering accelerator, removing the second input VLAN-ID added to the first data packet, processing the first data packet with a second service function, adding the second output VLAN-ID to the first data packet, and transmitting the first data packet to the second traffic steering accelerator.

13. The system of claim 12, wherein the second traffic steering accelerator further receives the first data packet from the second service VM and transmits the first data packet to the second application VM based on the second output VLAN-ID and the first chain of records.

14. A method for steering data packets in a communication network that includes a virtual local area network identifier (VLAN-ID) assignment module, a service-chaining module, a traffic steering controller, and a plurality of compute nodes having a corresponding plurality of processors for executing a plurality of application and service virtual machines (VMs) and a corresponding plurality of traffic steering accelerators, wherein a first one of the compute nodes includes a first processor and a first one of the traffic steering accelerators, the method comprising:

generating a plurality of records by the VLAN-ID assignment module, wherein each of the records includes a VLAN-ID set and a port number of a corresponding one of the service VMs, and wherein the VLAN-ID set includes input and output VLAN-IDs of the corresponding service VM;

associating the plurality of records with the plurality of service VMs;

receiving the plurality of records at the service-chaining module;

generating a plurality of service chaining rules associated with a plurality of n-Tuples configured for the plurality of application VMs;

receiving the service chaining rules and the corresponding plurality of records at the traffic steering controller;

sequencing the plurality of records based on the plurality of service chaining rules for generating a plurality of chained records;

executing a first one of the application VMs and a first set of the service VMs by the first processor, wherein the first application VM outputs a first one of the data packets;

receiving the first data packet at the first traffic steering accelerator;

providing the first data packet to the traffic steering controller;
provisioning a first chain of the chained records corresponding to a first one of the n-Tuples based on the first data packet to the first traffic steering accelerator;
retrieving a first record of the first chain;
retrieving a first input VLAN-ID of the first record;
adding the first input VLAN-ID to the first data packet; and
transmitting the first data packet to at least one of a first one of the service VMs and a second one of the traffic steering accelerators based on the first input VLAN-ID.

15. The method of claim 14, further comprising:
receiving the first record from the VLAN-ID assignment module at the first service VM, wherein the first record includes the first input VLAN-ID, a first output VLAN-ID, and a first port number;
receiving the first data packet from the first traffic steering accelerator;
removing the first input VLAN-ID from the first data packet;
processing the first data packet with a first service function;
adding the first output VLAN-ID to the first data packet; and
transmitting the first data packet to the first traffic steering accelerator.

16. The method of claim 15, further comprising:
removing the first output VLAN-ID added to the first data packet by the first traffic steering accelerator;
identifying the first record based on the first output VLAN-ID;
identifying a second record of the first chain;
determining a second input VLAN-ID of the second record;
adding the second input VLAN-ID to the first data packet; and
transmitting the first data packet to at least one of the first set of service VMs and the second traffic steering accelerator based on the second input VLAN-ID.

17. The method of claim 16, further comprising executing a second application VM and a second set of service VMs by a second one of the processors of a second one of the compute nodes, wherein the second compute node includes the second traffic steering accelerator.

18. The method of claim 17, further comprising:
receiving the first data packet from the first traffic steering accelerator at the second traffic steering accelerator using a network overlay protocol;
providing the first data packet to the traffic steering controller;
receiving the first chain of the chained records from the traffic steering controller;
retrieving the second record from the first chain based on the second input VLAN-ID of the first data packet; and
transmitting the first data packet to the second service VM of the second set of service VMs based on the second input VLAN-ID.

19. The method of claim 18, further comprising:
receiving the second record at the second service VM, wherein the second record includes the second input VLAN-ID, a second output VLAN-ID, and a second port number;
receiving the first data packet from the second traffic steering accelerator;
removing the second input VLAN-ID added to the first data packet;
processing the first data packet with a second service function;
adding the second output VLAN-ID to the first data packet; and
transmitting the first data packet to the second traffic steering accelerator.

20. The method of claim 19, further comprising:
receiving the first data packet at the second traffic steering accelerator; and
transmitting the first data packet to the second application VM based on the second output VLAN-ID and the first chain of the chained records.

* * * * *